United States Patent
Rode et al.

(10) Patent No.: US 10,522,991 B2
(45) Date of Patent: Dec. 31, 2019

(54) COMPACT BUSWAY FOR LOW AND MEDIUM VOLTAGE

(71) Applicant: EATON INTELLIGENT POWER LIMITED, Dublin (IE)

(72) Inventors: Prashant Pandurang Rode, Jaysingpur (IN); Gordon Pettersen, Greenwood, SC (US); Ben Schermerhorn, Greenwood, SC (US); Arnab Guha, Pune Maharashtra (IN); Amogh Kank, Dombivli (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/991,224

(22) Filed: May 29, 2018

(65) Prior Publication Data
US 2019/0372326 A1    Dec. 5, 2019

(51) Int. Cl.
| H02B 1/21 | (2006.01) |
| H02G 5/02 | (2006.01) |
| H02G 5/00 | (2006.01) |
| H02B 13/00 | (2006.01) |
| H02G 5/08 | (2006.01) |
| H02B 3/00 | (2006.01) |
| H02B 1/30 | (2006.01) |

(52) U.S. Cl.
CPC ............. *H02G 5/08* (2013.01); *H02B 1/21* (2013.01); *H02B 1/30* (2013.01); *H02B 3/00* (2013.01); *H02B 13/005* (2013.01); *H02G 5/007* (2013.01); *H02G 5/025* (2013.01)

(58) Field of Classification Search
CPC ... H02B 1/20; H02B 1/21; H02B 1/30; H02B 13/005; H02G 5/025
See application file for complete search history.

(56) References Cited

U.S. PATENT DOCUMENTS

| 3,553,534 A * | 1/1971 | Bould et al. | H02B 1/21 361/608 |
| 6,781,818 B2 * | 8/2004 | Josten | H02B 1/21 174/149 B |

(Continued)

FOREIGN PATENT DOCUMENTS

| WO | WO-2004059810 A2 * | 7/2004 | ............ H02B 1/20 |
| WO | WO-2009090117 A1 * | 7/2009 | ............ H02B 1/21 |

*Primary Examiner* — Robert J Hoffberg
(74) *Attorney, Agent, or Firm* — Squire Patton Boggs US LLP

(57) ABSTRACT

A compact busway system for low and medium voltage application is described. In particular, the described compact busway system is designed for low and medium power distribution systems for high current applications. The described compact busway system has a enclosure assembly with at least two side mount supports affixed to the enclosure assembly and at least two horizontal supports, a first horizontal support and a second horizontal support, which are connected and perpendicular to the at least two side mount supports. The compact busway system further includes at least one busbar affixed between the first horizontal support and the second horizontal support, at least one strap connected to the first horizontal support and the second horizontal support, and at least one ground bus connected to the enclosure assembly.

19 Claims, 12 Drawing Sheets

(56) References Cited

U.S. PATENT DOCUMENTS

| | | | | |
|---|---|---|---|---|
| 6,870,103 B1* | 3/2005 | Wiant | ................... | H02G 5/007 |
| | | | | 174/68.2 |
| 7,616,431 B2* | 11/2009 | Moore | ................... | H02G 5/025 |
| | | | | 174/149 B |
| 7,786,384 B2* | 8/2010 | Diaz | ....................... | H02B 1/21 |
| | | | | 174/88 B |
| 7,952,025 B2* | 5/2011 | Diaz | ....................... | H02B 1/21 |
| | | | | 174/68.2 |
| 8,363,389 B2* | 1/2013 | Jurek | ..................... | H02B 1/32 |
| | | | | 361/614 |
| 8,619,411 B2* | 12/2013 | Rodrigues | ............... | H02B 1/21 |
| | | | | 174/68.2 |
| 8,717,741 B2* | 5/2014 | Valenzuela | ......... | H01R 25/162 |
| | | | | 174/149 B |
| 9,780,538 B2* | 10/2017 | Lee | ........................ | H02B 1/20 |

* cited by examiner

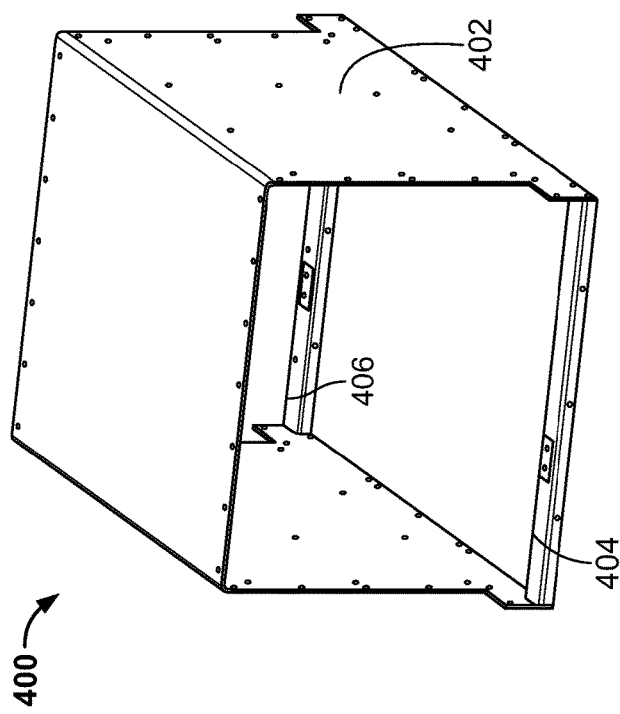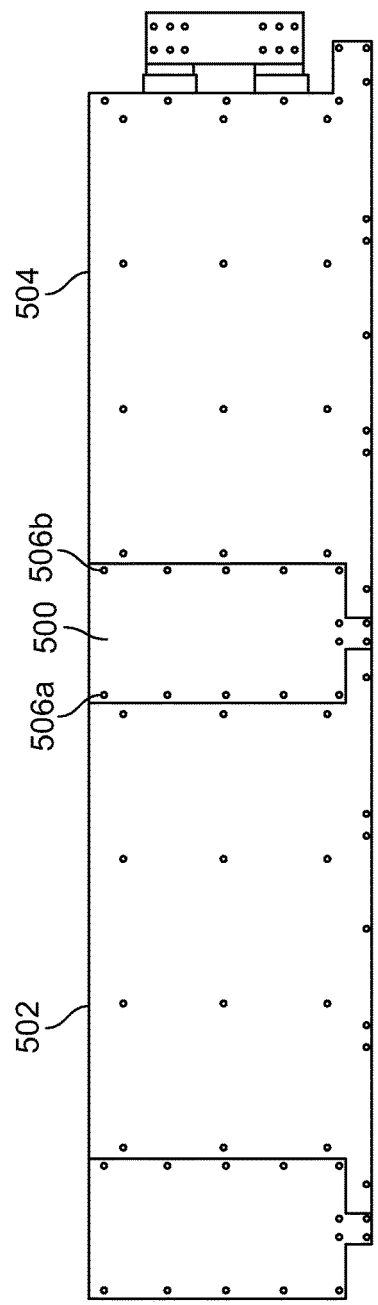
FIG. 4
FIG. 5

COMPACT BUSWAY FOR LOW AND MEDIUM VOLTAGE

FIELD OF INVENTION

The present disclosure is directed to a busway. More particularly, the present disclosure is directed to a compact busway for low and medium voltage applications.

BACKGROUND

Current busway systems are designed to function in either a low voltage system or a medium voltage system. As each type of voltage system is required to meet different certifications, a standard offering is not available to meet both. This requires a separate busway systems for low voltage systems and a different busway system for medium voltage busway systems. Additionally, current systems are not designed to fit in a compact space.

SUMMARY OF THE INVENTION

In one embodiment, a compact busway arrangement for low or medium voltage systems is described. The compact busway arrangement comprises an enclosure assembly, at least two side mount supports affixed to the enclosure assembly, at least two horizontal supports, a first horizontal support and a second horizontal support, connected and perpendicular to the at least two side mount supports. The compact busway arrangement also comprises at least one busbar affixed between the first horizontal support and the second horizontal support, at least one strap connected to the first horizontal support and the second horizontal support, and at least one ground bus connected to the enclosure assembly.

In yet another embodiment, a compact busway system for use in low and medium voltage power distribution applications rated for high current is described. The compact busway system comprises an enclosure housing assembly, at least two enclosure housing assembly side supports connected to the enclosure housing assembly via a first fastener, and at least two or more horizontal supports connected perpendicular to the at least two enclosure housing assembly side supports, wherein a first horizontal support is connected parallel to a second horizontal support. The compact busway system further comprises at least one or more busbars, the busbars connected perpendicular to the first horizontal support and second horizontal support, at least one strap connected to the first horizontal support and the second horizontal support, at least one ground plate connected to the enclosure housing assembly, at least one splice plate connected to the end point of the at least one or more busbars using a fastener, and at least one insulating boot to cover a busbar joint, and at least one joint cover connected to the end point of the at least one busbars to secure multiple compact busway arrangement sections together.

In yet another embodiment, a compact busway system for low and medium voltage applications is described. The busway system comprises a continuous enclosure housing configured to meet dimensions for a compact design application for use in indoor or outdoor applications, at least two side supports configured to fit within the continuous enclosure and attached to the continuous enclosure housing, at least four horizontal supports, a first horizontal support adjacent to a second horizontal support, and a third horizontal support adjacent the second horizontal support and a fourth horizontal support, the at least four horizontal supports connected to the at least two side supports. The compact busway system further comprises at least four straps bolted at opposite ends of the at least four horizontal side supports, configured to support and exert a clamp force on the at least four horizontal supports, at least one busbar, wherein the at least one copper busbar includes a coating for insulation and a plating, the at least one busbar clamped to a first horizontal support and second horizontal support, and at least one ground bar connected to the continuous enclosure housing.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 4 illustrates an enclosure housing of the exemplary busway;

FIG. 5 illustrates a side view of a pair of busway sections connected by a collar joint;

DETAILED DESCRIPTION

The disclosure is described in the context of utilizing a compact busbar design for use in indoor and outdoor low and medium voltage applications.

Figure 1A:
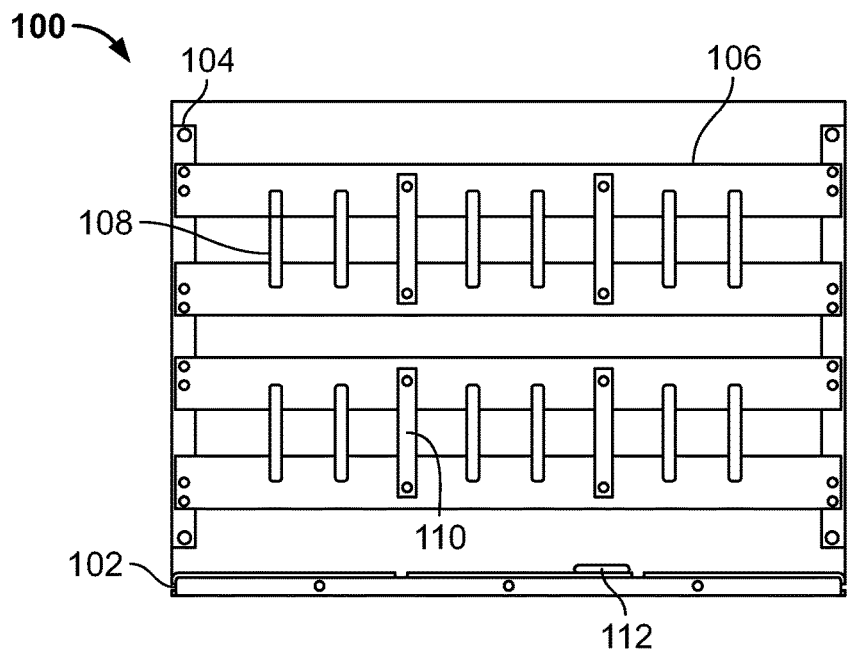
FIG. 1A illustrates a front view of a straight section of an exemplary busway.

FIG. 1A illustrates a front view of a straight section of an exemplary busway 100. The busway 100 includes an enclosure assembly 102 with a plurality of busbar support assemblies. A single busbar support assembly can be seen in this view. In one embodiment, the busway enclosure is a straight section. In another embodiment, the busway enclosure can be an elbow section. In still another embodiment, the busway enclosure can be a T-configuration section. In still another embodiment, the busway enclosure can be a flange configuration section. The enclosure assembly 102 can be a metal assembly such as an aluminum enclosure or steel enclosure.

The busbar support assembly includes a pair of side mount supports 104, each of which is bolted to opposing sides of the enclosure assembly 102 at predefined locations. In the illustrated embodiment, the side mount supports 104 are rectangular bars. However, it should be understood that the side mount supports may have any geometric shape. The side mount supports may be constructed of, without limitation, glass polyester material, molded epoxy supports, sheet molded compound (SMC), molded plastics, steel or aluminum brackets. The support span between the support types is standardized. A single design for the side mount supports 104 (shown in FIG. 1A) reduces variety, increases volume, lowers unit cost, and reduces inventory required.

Four horizontal supports 106 extend between the pair of side mount supports 104. The horizontal supports 106 are bolted at both ends to the side mount support 104 and are used to hold the busbars in place, even if a high current crosses the busbar. In the illustrated embodiment, the horizontal supports 106 are rectangular bars. However, it should be understood that the side mount supports may have any geometric shape. The horizontal supports may be constructed of insulating materials. Exemplary insulating materials include, without limitation, glass polyester GPO-3, epoxy, and porcelain. GPO-3 is a fiberglass reinforced thermoset polyester. Glass polyester supports may be employed for low voltage and medium voltage applications. Epoxy, porcelain, and GPO-3 may be used for medium voltage applications. Using standardized optimum spacing between busbar rows allows a standard design to utilize different horizontal supports (epoxy or porcelain or GPO-3).

The four horizontal supports 106 are arranged as two pairs of horizontal supports, with each pair of horizontal supports supporting six busbars 108. The pairs of horizontal supports include a lower pair and an upper pair, such that the busbars 108 are in a two-story arrangement. The busbars are elongated bars, and may be constructed of copper or other conductive material. The busbars 108 are clamped at the top and bottom by the horizontal supports 106. The busbars 108 are covered with insulation such as an epoxy coating. Insulation is added to meet the safety certifications and reliable performance. Insulation is used in a medium voltage application to meet dielectric performance requirements. However, it should be understood that in an alternative embodiment, the busbars may not include insulation coating when used in a low voltage application.

Straps 110 are bolted at both ends to the top and bottom horizontal supports 106 in each pair of horizontal supports. In the illustrated embodiment, two straps 110 are employed on each pair of horizontal supports 106. However, it should be understood that any number of straps may be employed. The straps 110 hold the busbar together and exert a clamping force on horizontal supports 106. The straps 110 may be flexible and constructed of a material such as polyester. In an alternative embodiment, the straps are rigid. In an alternative embodiment, the straps are molded epoxy supports. In another alternative embodiment, the straps are sheet-molded compound (SMC) or molded plastics.

The busway also includes a ground bar 112 bolted at the inner bottom surface of the busway enclosure assembly 102 at both ends. The ground bar 112 provides a low resistance path to fault currents (for example in lightning, etc.) in abnormal conditions and protects equipment from damage and human beings from shocks. The ground bar 112 can be made from copper, aluminum, or flexible copper. However, it should be understood that the ground bar 112 can be located at any position along the enclosure assembly. It should also be understood that the ground bar may be any thickness or length. In an alternative embodiment, the enclosure assembly can act as a ground path.

Figure 1B:
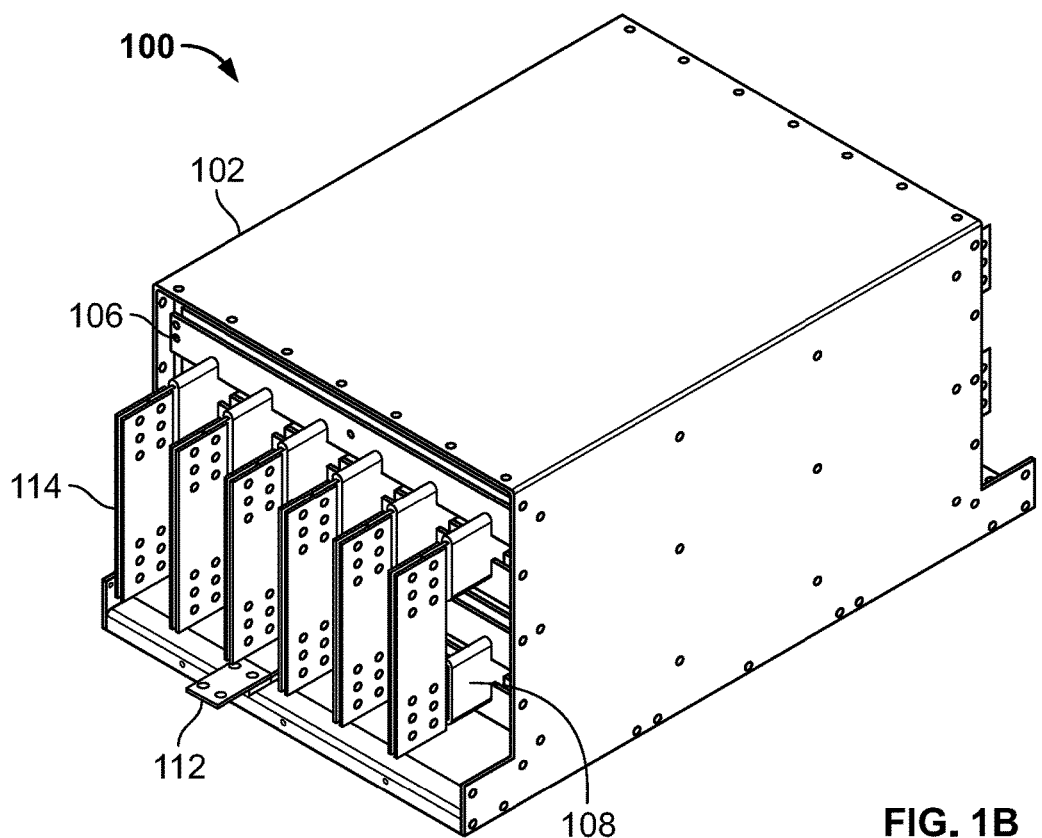
FIG. 1B illustrates a perspective view of a straight section of a full busway.

FIG. 1B perspective view of a straight section of a full busway 100 as shown in FIG. 1A. FIG. 1B is substantially the same as FIG. 1A except for the differences detailed below. A complete enclosure housing 102 with a plurality of busbar support assemblies is illustrated. The enclosure housing 102 includes the side support mounts (not shown in FIG. 1B) and four horizontal supports 106. The four horizontal supports, 106 are bolted at both ends to the side mount supports and support the six illustrated busbars 108. The splice plates 114 provide a connection between the busbars 108. As described with reference to FIG. 1A, the horizontal supports 106 are held in place by straps 110 (not shown in FIG. 1B). A ground bar 112 is placed along one side of the enclosure housing 102 to ground the busway and protect human beings from shocks and equipment damage.

Figure 2A:
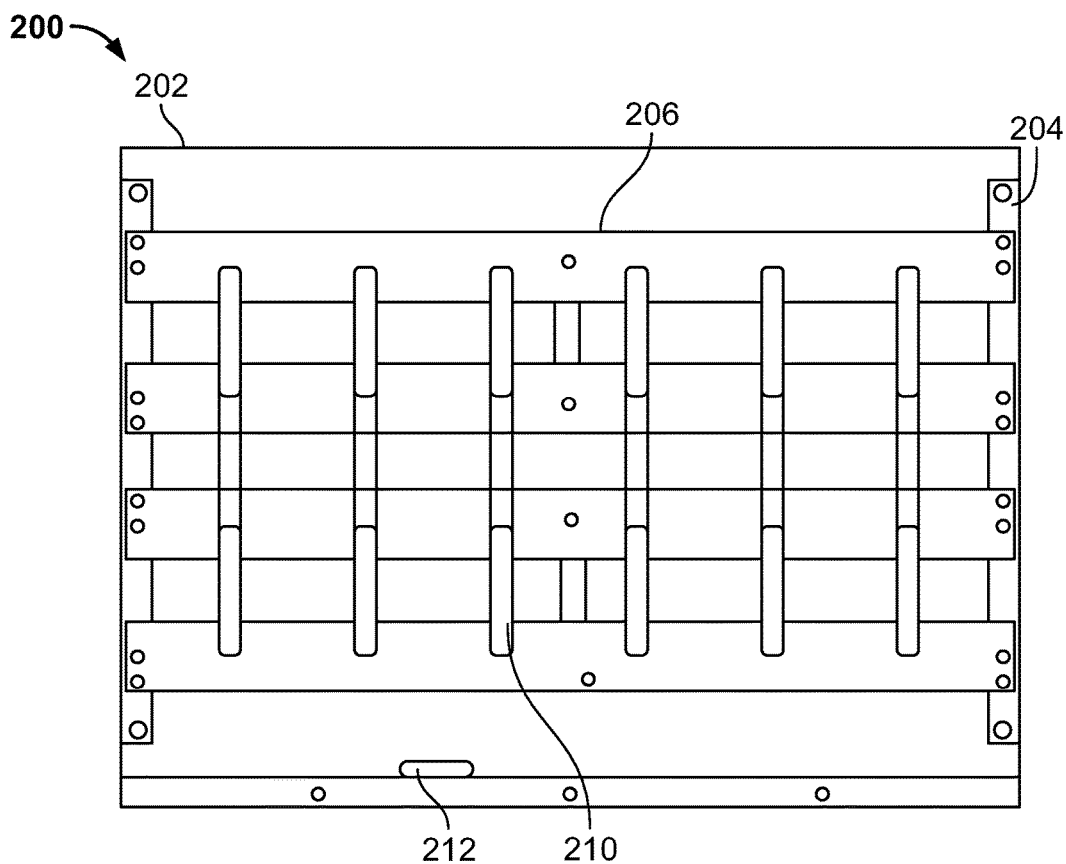
FIG. 2A illustrates a front view of a straight section of an alternative embodiment of a busway.
Figure 2B:
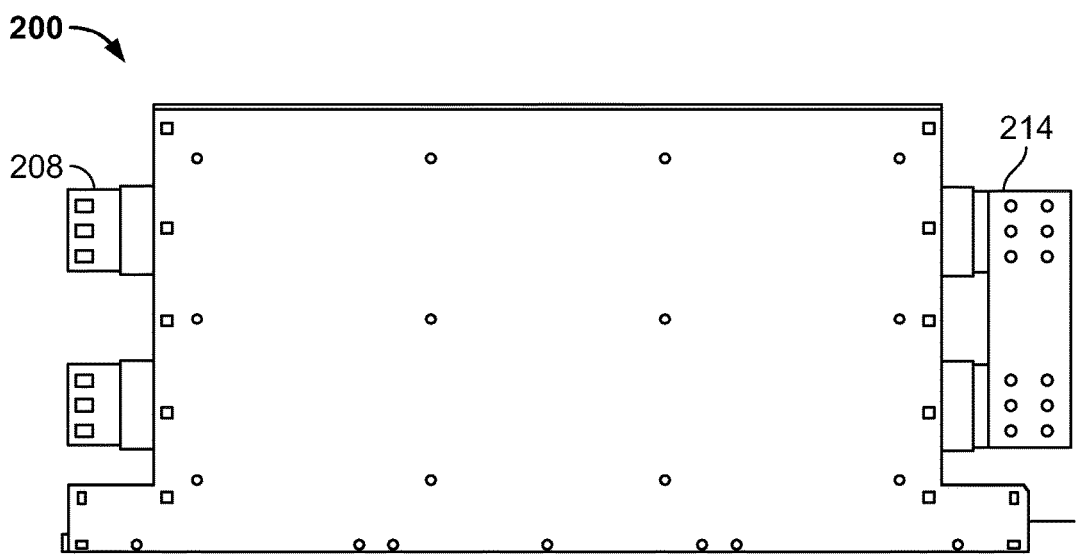
FIG. 2B illustrates a side view of a straight section of an alternative embodiment of a busway.
Figure 2C:
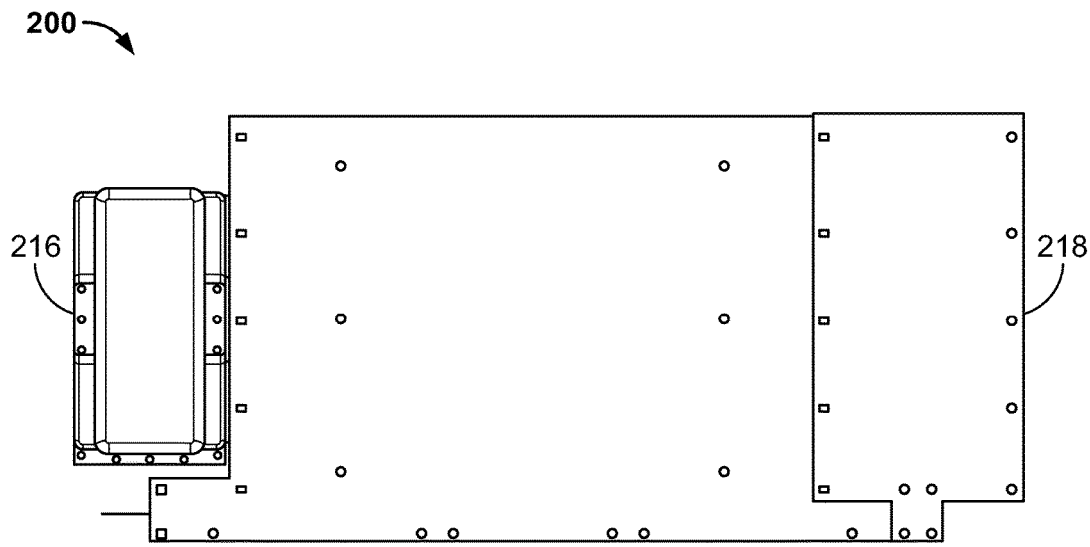
FIG. 2C illustrates an alternate side view of a straight section of an alternative embodiment of a busway.

FIG. 2A illustrates a front view of another embodiment of a straight section of an alternative embodiment of a busway 200. FIG. 2B illustrates a side view of a straight section of an alternative embodiment of a busway and FIG. 2C illustrates an alternate side view of a straight section of an alternative embodiment of a busway. The busway 200 will be described with reference to FIGS. 2A-2C.

With reference to FIG. 2A, the busway 200 is substantially the same as the busway 100 above, except for the differences described herein. The busway 200 includes an enclosure assembly 202, side mount supports 204, horizontal supports 206, straps 210, and ground bus 212. With further reference to FIG. 2B, the busway also includes a splice plate 214, and bus bars 208. With still further reference to FIG. 2C, the busway also includes insulating boots 216, and a joint cover 218. The splice plate 214, insulating boots 216, and joint cover 218 are used to join two different sections. The insulating boots 216 cover a busbar joint and are made from an insulating material. In one embodiment, the insulating material is a PVC material.

The busbar arrangement can be used in an indoor and outdoor application and can be unventilated allowing for natural heat dissipation by natural convection. In another embodiment, the busbar arrangement can be used in an outdoor application. In another embodiment, the busbar arrangement can be used in an indoor application. In an alternative embodiment, the busbar arrangement can be ventilated to assist with heat dissipation.

In one embodiment, the busbar has optional uninsulated busbars for a 600V application and insulated busbars for a 5 or 15 KV application. In another embodiment, the busbar utilizes a 3-wire system layout. In another embodiment, the busbar utilizes a 4-wire system layout. A 3-wire system layout includes busbars for three phases whereas a 4-wire system layout has a neutral busbar and busbars for three phases.

Figure 3:
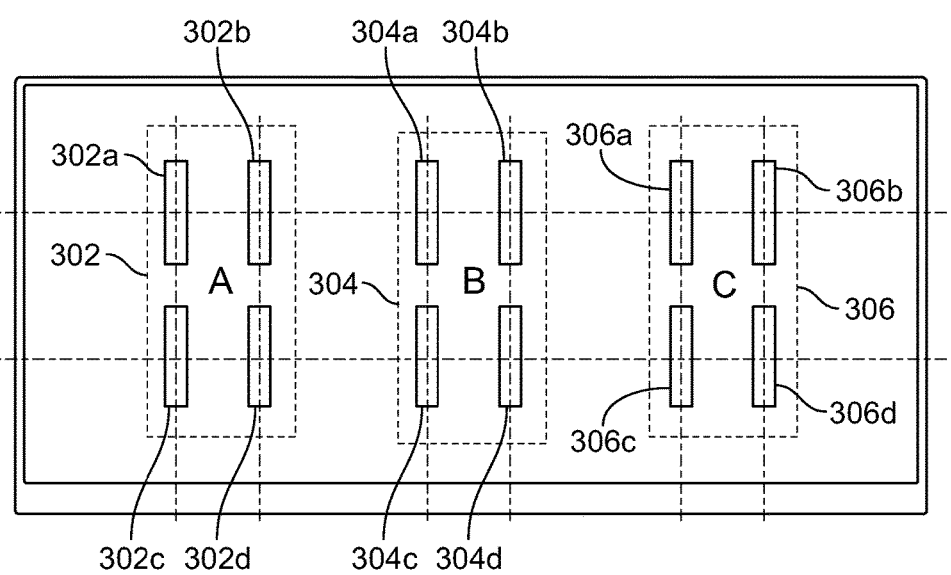
FIG. 3 is a schematic drawing illustrating one embodiment of groupings of the busbars in the exemplary busway.

FIG. 3 illustrates a schematic drawing of one embodiment of groupings of the busbars in the exemplary busway. The illustrated embodiment shows three, two-story groupings 302, 304, 306. Each two-story grouping 302, 304, 306 includes a grouping of four busbars arranged in pairs with one pair on top of a second pair. Two-story busbar grouping 302 has four busbars 302a, 302b, 302c, 302d, two-story grouping 304 has four separate busbars, 304a, 304b, 304c, 304d, and two-story busbar grouping 306 has another four separate busbars 306a, 306b, 306c, 306d. A two-story busbar grouping 302, 304, 306 is used to achieve required cross-section and conductivity for the current flow to meet certification and voltage requirements. Busbars are arranged in two different rows to form a two-story busbar grouping 302, 304, 306.

The two-story busbar arrangement allows easy connection using splice joints, described at least in FIGS. 2A, 2B, and 2C, between busbars of the same phase from different rows at each joint or during termination of a busbar arrangement. The two-story busbar arrangement also provides a surface area for heat dissipation through natural convection. The two-story busbar arrangement also improves manufacturability by creating a universal and standard design. The universal and standardized busbar designs allow the same busbar to be used for any phase within a busbar arrangement irrespective of location creating a low cost capital investment for additional required tooling to meet system specification and a reduction in required inventory. Busbar spacing between bars of the same phase and different phases has been optimized in a two-story busbar arrangement. This arrangement provides for lower watt losses and therefore lower heat generation due to proximity effect and better thermal performance.

The busbar support design has been standardized to meet different short circuit ratings. Design for the typical short circuit rating includes the same two-story busbar layout 302, 304, 306, with the busbars 302a, 302b, 302c, 302d, 304a, 304b, 304c, 304d, 306a, 306b, 306c, 306d positioned on the horizontal supports 106 within the enclosure assembly 102 as described previously. The horizontal supports 106 are connected to the side mount supports 104 within the enclosure assembly 102. The quantity of horizontal supports 106 and the axial spacing of the side mount supports 104 are modified to meet the short circuit rating requirements. The standardization of the components for a standard busway system or a short circuit rating system lowers the overall cost and required inventory.

FIG. 4 is a perspective view of an enclosure housing. The enclosure housing 400 includes a C-section 402 connected to an angle bracket 404 at one end and a channel bracket 406 at other end. In one embodiment, the angle bracket 404 and channel bracket 406 are welded to the C-section 402. Alternatively, the angle bracket 404 and channel bracket 406 may be connected to the C-section 402 with bolts, rivets, or other fasteners.

The combination of the enclosure housing welded to the angle bracket and channel bracket provides stability and robustness to the overall enclosure housing. The reinforced enclosure housing allows it withstand the highest short circuit current rating. The length of the enclosing housing will vary in length to meet application requirements.

FIG. 5 illustrates a side view of a pair of busway sections connected by a collar joint. As illustrated, a collar 500 connects multiple enclosure housings 502, 504 for multiple busway sections. The collar 500 is a joint cover that is used between sections to provide protection in both indoor and outdoor applications. The collar joint 500 is a standardized plate designed to cover the opening between the multiple busway sections. As shown in FIG. 5, the collar joint is primarily a rectangular shape with a square portion to connect and cover the small opening at one end of the busway sections. However, it should be understood, that the collar joint can be any geometric shape to fully cover the opening between the busway sections to be joined. The collar or joint cover can be aluminum or steel or in the alternative stainless steel. Small openings 506a, 506b in the collar 500 are used to connect the collar 500 to the multiple enclosure housings 502, 504. The collar 500 can be connected to the enclosure housing using standardized screws. In another embodiment, the collar joint 500 can be connected to the enclosure housing using standardized bolts or, rivets or other fasteners.

Figure 6A:
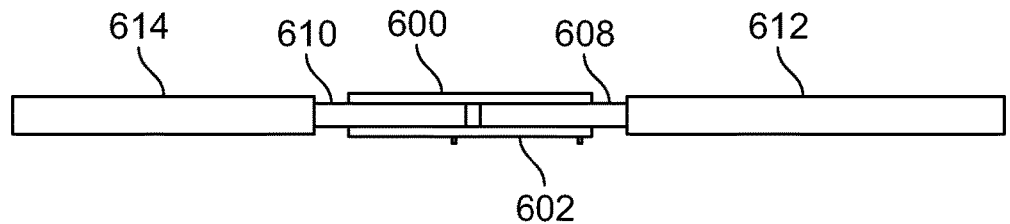
FIG. 6A illustrates a top view of a pair of busbars connected by a splice plate.
Figure 6B:
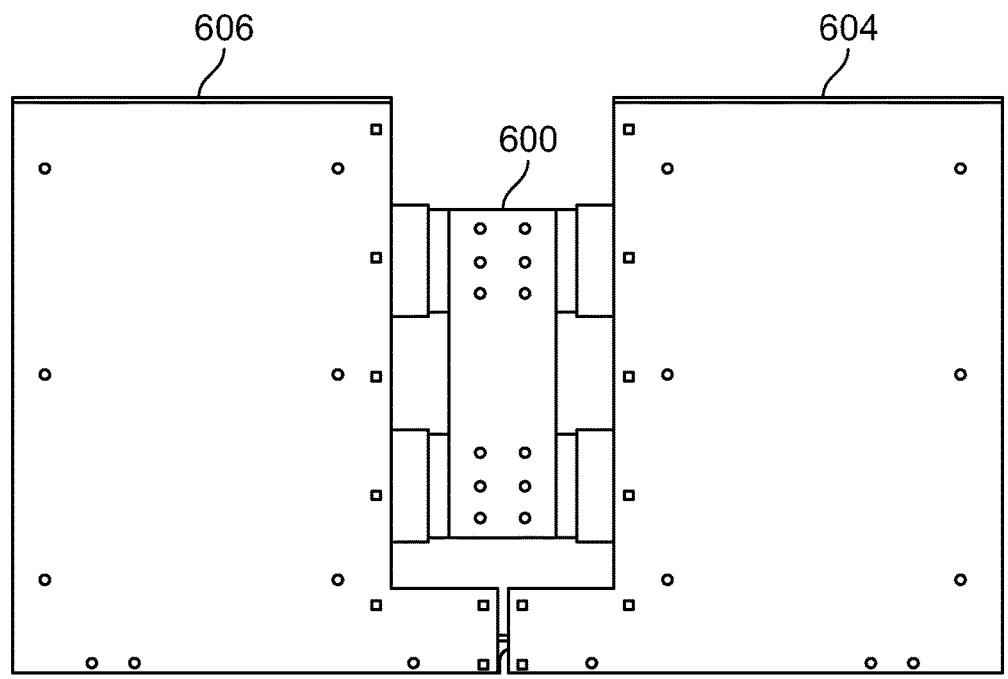
FIG. 6B illustrates a side view of two exemplary busways with a splice plate adjoining multiple busbars.

FIG. 6A and FIG. 6B illustrate a top view and side view, respectively, of a splice plate 600, 602 adjoining multiple busways 604, 606. The splice plates 600, 602 are placed over the busbars 608, 610, between the insulated portions 612, 614. Splice plates 600, 602 are used to join busbars 608, 610 from one busway section to another busway section. The splice plates 600, 602 are standardized and universal designs. In one embodiment, the plates 600, 602 are rectangular in shape. However, it should be understood, that the splice plates 600, 602 can be any geometric shape to fully connect the busbars.

The splice plates 600, 602 act as equalizer connections for current flow and balances current between busbars within the same phase. The collar joint 500, previously described, covers the splice plate 600, 602 connections. One splice place is secured externally on each side of the busbar to form a lap joint at both ends. The same splice plate joins the busbars from the top and bottom rows for each particular phase. Splice plates are applied upon installation in the same manner. Splice plates 600, 602 are universal and standardized, eliminating the need for specialized inventory for different systems. Splice plates 600, 602 are secured to the busbars 608, 610 using bolts. In another embodiment, the slice plates 600, 602 are secured to the busbars 608, 610 using screws, however it should understood that the splice places 600, 602 can be secured to the busbars 608, 610 using any connector. For higher current systems, using external splice plates and shorting the two story busbars of the same phase together creates a stronger arrangement to withstand higher short circuit currents. The use of splice plates reduces assembly time and allows for a single insulation boot.

Figure 7:
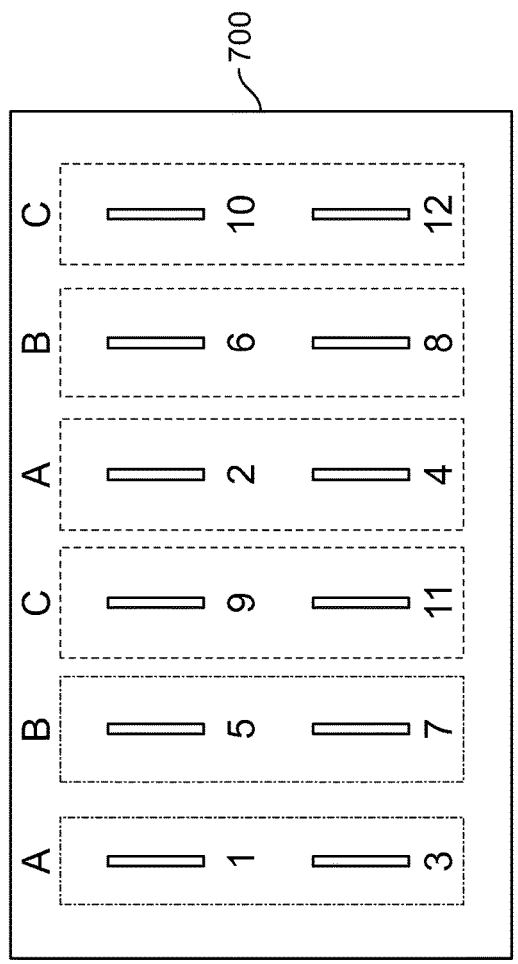
FIG. 7 is a schematic drawing illustrating an interleaved busbar arrangement for the busway.

The busbars in the busway arrangement may be arranged in different arrangements. FIG. 7 is a schematic drawing illustrating an interleaved busbar arrangement for the busway 700. Interleaved busbars (A B C A B C) in a two-story arrangement generates 36% less heat loss due to reduction in proximity effect. Additionally, interleaved busbars in a two-story arrangement have improved current distribution and overall lower temperature rise at rated current application. Further, interleaved busbars have a lower impedance per phase resulting in better voltage regulation and generate lower short circuit forces resulting in a cost effective support system for the same fault current.

Figure 8:
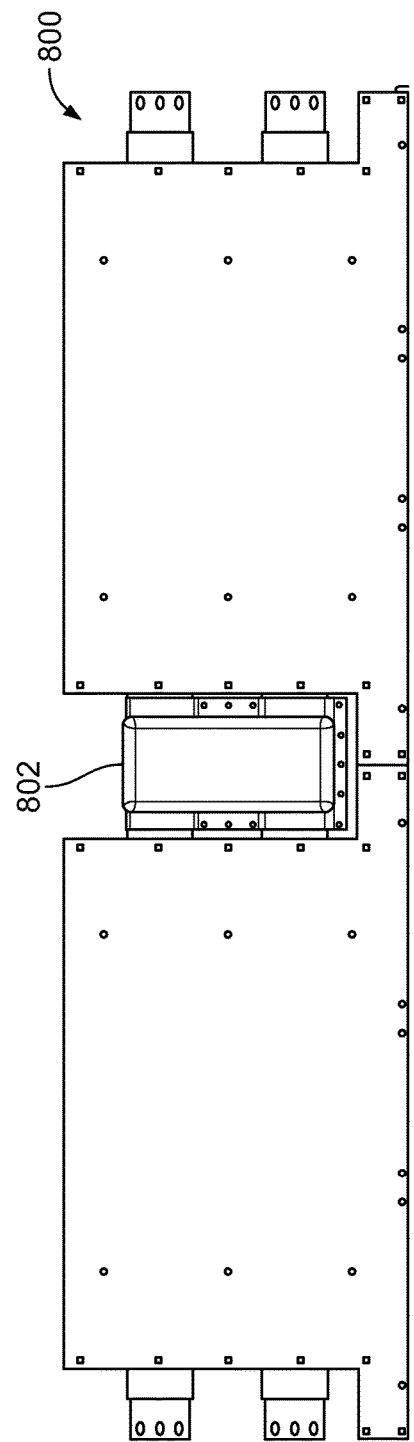
FIG. 8 illustrates a side view of a single insulating boot cover connecting multiple sections of the busway arrangement.

FIG. 8 illustrates a side view of a single insulating boot cover assembly 800. A single insulating boot 802 covers the splice plate joint 600, 602 of the busway arrangement is shown. A single insulating boot covering the splice plate joint and overlapping the insulation allows the busway arrangement to withstand highest breakdown impulse level. The overlap creates a reliable performance in the busway arrangement. Additionally, the insulating boot design allows it to be assembled upside down or vice versa.

Figure 9A:
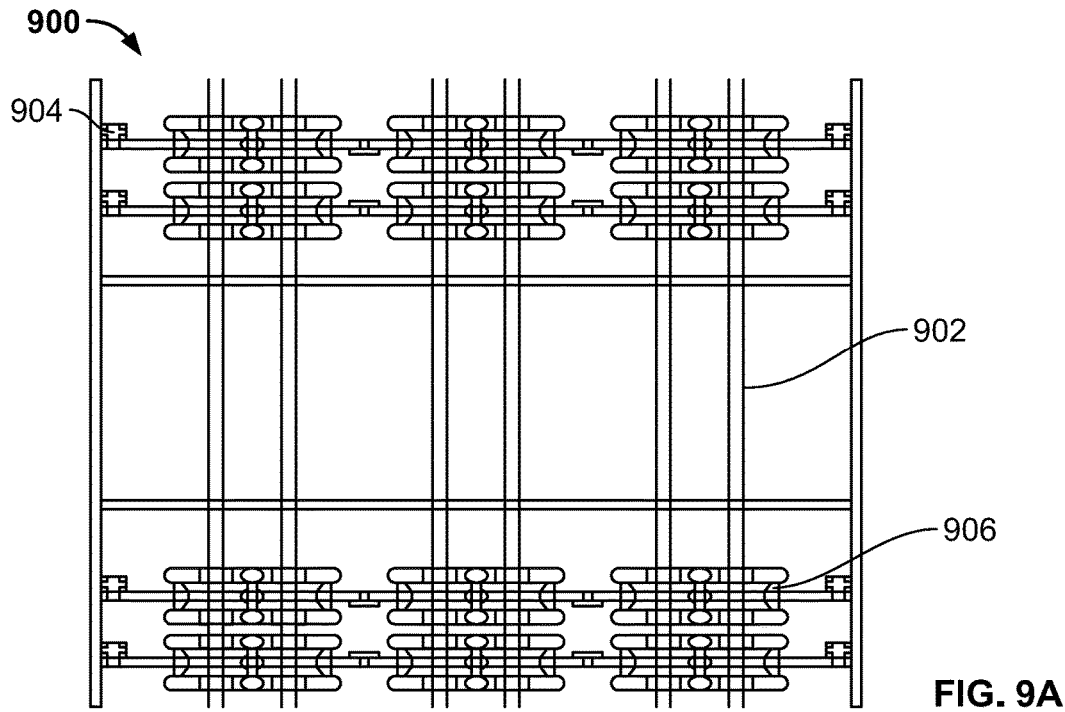
FIG. 9A illustrates a top view of a length-wise staggered support layout for an exemplary busway arrangement.
Figure 9B:
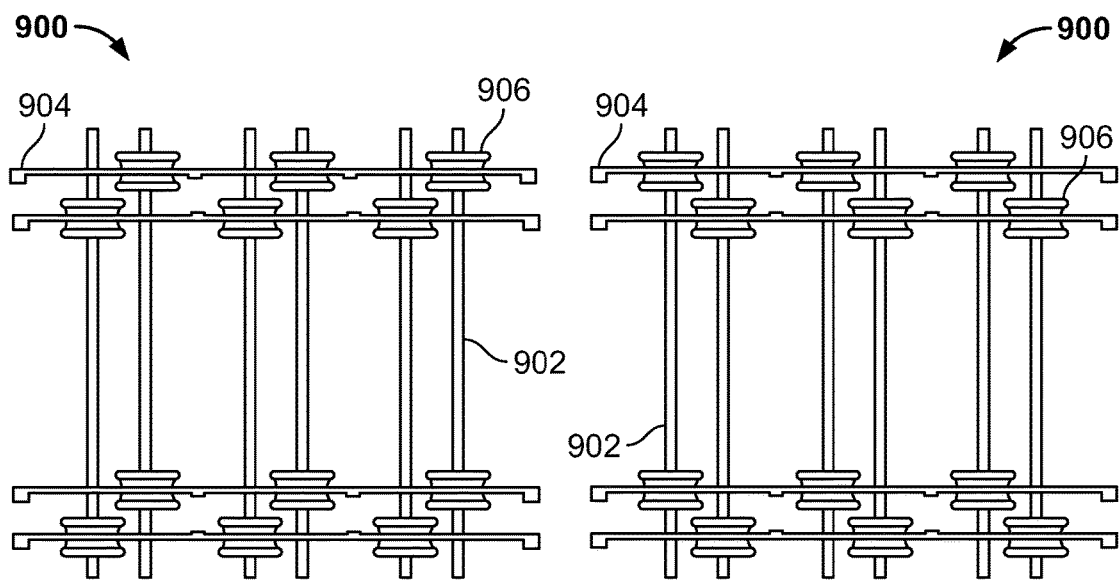
FIG. 9B illustrates a top view of a length-wise staggered support layout of each story of a two-story exemplary busway arrangement.

FIG. 9A illustrates a top view of a length-wise staggered support layout for an exemplary busway arrangement 900. FIG. 9B illustrates a top view of each layer of a two-story arrangement of the length-wise staggered support layout 900. A staggering support arrangement allows for a compact design with different variety of supports (porcelain insert or epoxy insert), and busbars to be placed in the smallest width of enclosure with maximum clearance and creepage distances (phase to phase and phase to ground) for the highest breakdown impulse level rating (BIL). Additionally, universal and standardized support designs allows the same support assembly to be used regardless of the location allowing for easier assembly. Further, staggering support arrangements allow the busbar to be supported randomly without any fixed pattern. In FIG. 9A, enclosure assembly six busbars 902 are visible, and are shown positioned on the assembly of the porcelain or epoxy insert or standoff insulator 906 and horizontal supports 904 (as this is a two story busbar arrangement, the remaining six bottom busbars are exactly below the top busbar and are not shown), as previously described with respect to FIGS. 3 and 7. Both the upper and lower epoxy inserts or standoff insulators 906 can be seen in this view.

The busbars 902 are very closely arranged on each horizontal support 904. Each busbar 902 is mounted at a slot of an insert or standoff insulator 906, and the insert or standoff insulators are connected to slots of the horizontal supports 904. The inserts or standoff insulators 906 are staggered lengthwise along the busbars to accommodate the compact design. The insert or standoff insulator 906 can be porcelain. In an alternative embodiment, the insert 906 can be an epoxy. Insert or standoff 906 is a block of insulators having slots or grooves for fitting with the busbar 902 and horizontal supports 904. Insert or standoff 906 insulator can made of molding or machining process. Insert or standoff 906 insulator can be of any shape.

In FIG. 9B, a top view of the two layers of the two story busbar arrangement are shown side-by-side. Each layer of the two story busbar arrangement has six busbars 902 mounted to the inserts or standoff insulators 906 along the horizontal supports 904. In one embodiment, the layout shown on the left is used in a top story and the layout shown on the right is used in a bottom story. In an alternative embodiment, the layout shown on the left is used in a bottom story and the layout shown on the right is used in a top story. The side-by-side images of FIG. 9B form FIG. 9A if placed on top of each other.

Figure 9C:
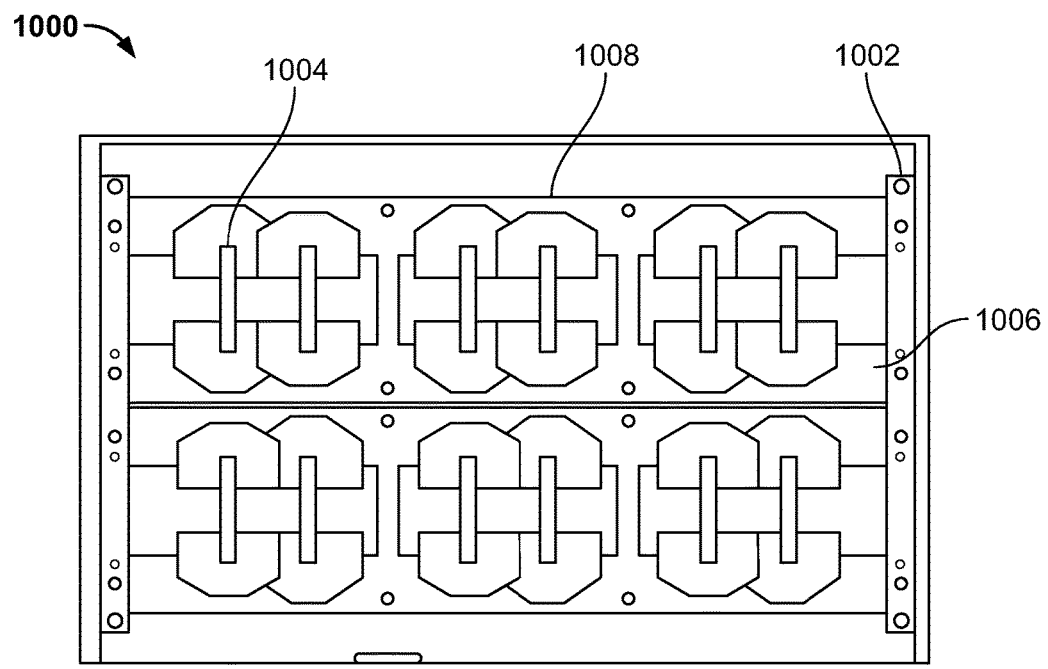
FIG. 9C illustrates a front view of a height-wise staggered support layout for an exemplary busway arrangement.

FIG. 9C illustrates a front view of a height-wise staggered support layout for an exemplary busway arrangement 1000. In this orientation, the rearward horizontal supports 1006 are blocked from view by the forward horizontal supports 1006. Thus, only the forward horizontal supports 1006 are visible. Both the forward and rearward insert or standoff insulators 1008 can be seen in this view.

Similar to FIG. 9A, FIG. 9C illustrates twelve busbars 1004 located in an enclosure housing 1002 placed along the horizontal supports 1006. Each busbar 1004 is mounted at a slot of an inserts or standoff insulators 1008. The inserts or standoff insulators 1008 can be porcelain. In an alternative embodiment, the inserts or standoff insulators can be epoxy. The inserts or standoff insulators 1008 are connected to slots of the horizontal supports 1006.

Figure 9D:
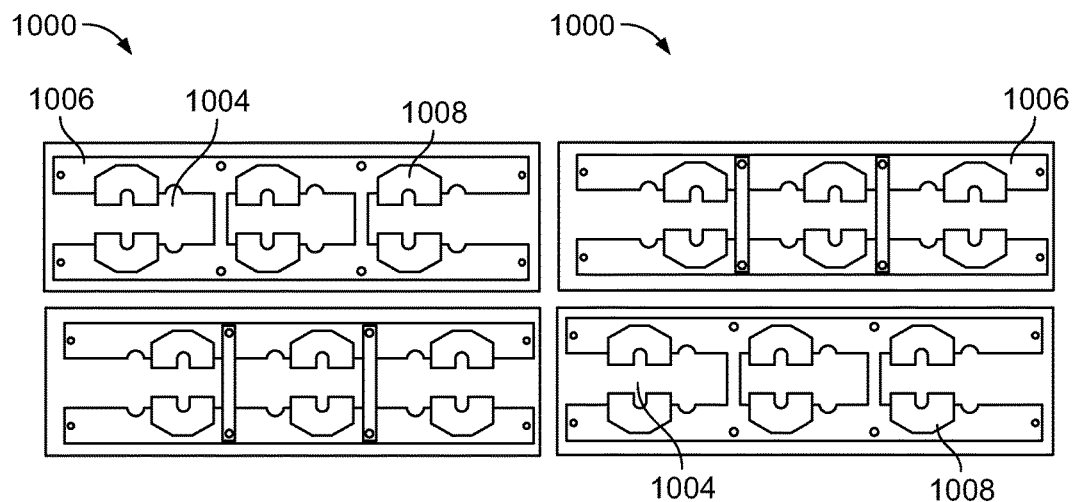
FIG. 9D illustrates a front view of a height-wise staggered support layout of the forward and rearward supports of a two-story exemplary busway arrangement.

In FIG. 9D, a front view of the forward and rearward horizontal supports 1006 are shown side-by-side. Each layer of the two story busbar arrangement has six busbars 1004 mounted to the inserts or standoff insulators 1008 along the horizontal supports 1006. In one embodiment, the layout shown on the left is used in the forward set of horizontal supports 1006 and the layout shown on the right is used in a rearward set of horizontal supports 1006. In an alternative embodiment, the layout shown on the left is used in a rearward set of horizontal supports 1006 and the layout shown on the right is used in a forward set of horizontal supports 1006. The side-by-side images of FIG. 9D form FIG. 9C if placed in front of each other. The benefits of a heightwise stagger arrangement are the same as lengthwise stagger support arrangement.

In an alternative embodiment, lengthwise stagger arrangement and heightwise stagger arrangement can be utilized within the busway arrangement to provide for a compact enclosure with maximum clearance and creepage distances.

Figure 10A:
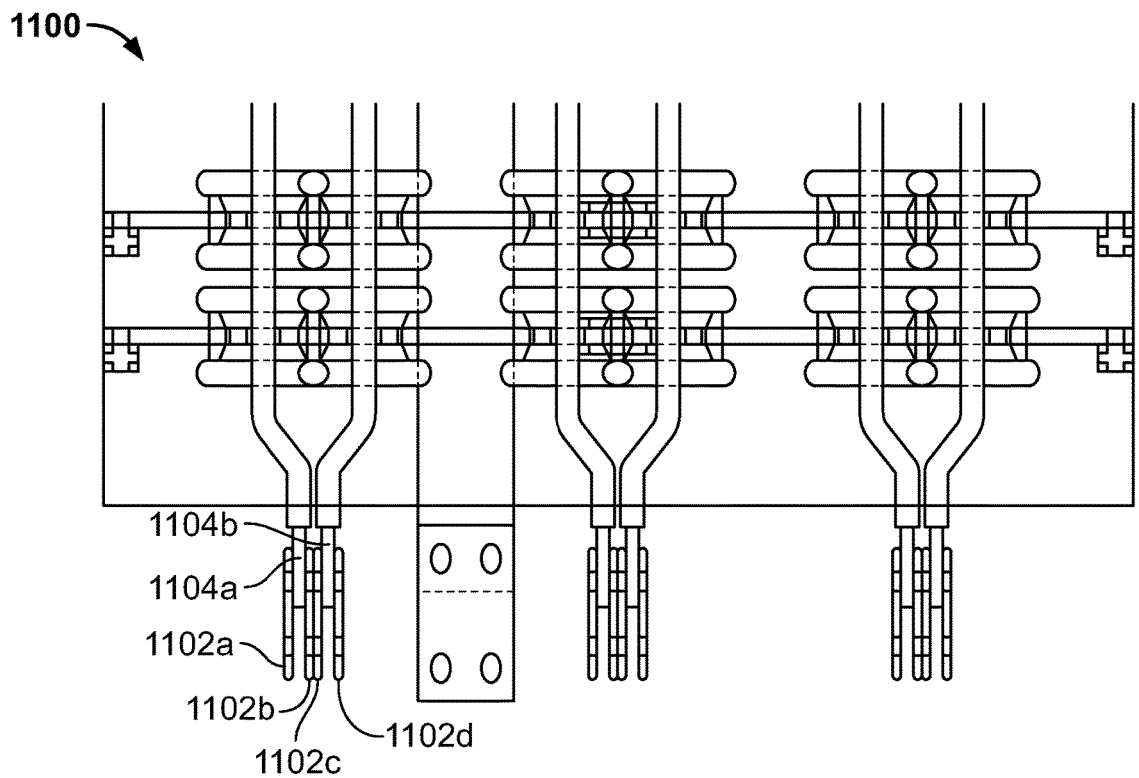
FIG. 10A illustrates a top view of a joint arrangement for an exemplary busway.

FIG. 10A illustrates a top view of a joint arrangement of four splice plates around the busbars with gaps between the busbars 1100. As shown in FIG. 10A, four splice plates 1102a, 1102b, 1102c, 1102d may be utilized with gaps between the busbars 1104a, 1104b. Splice plate 1102a and 1102d are located on the outsides of the busbars 1104a, 1104b. Splice plates 1102b and 1102c are located adjacent one another and between the busbars 1104a, 1104b. This allows for the busbars to tie together at each joint and share the overall load per phase. In another embodiment, not shown, there is a splice plate located on the outside of each side of the busbars and a single splice plate between the busbars.

Figure 10B:
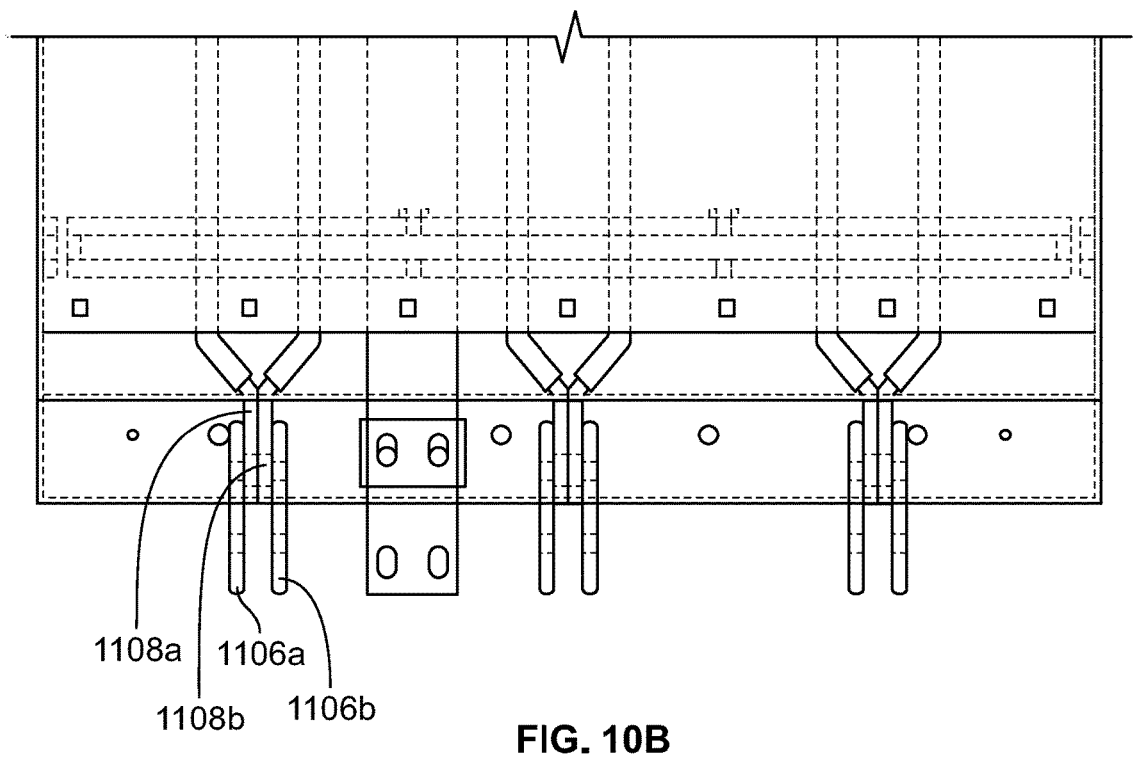
FIG. 10B illustrates a top view of an alternative embodiment of a joint arrangement for an exemplary busway.

FIG. 10B illustrates a top view of an alternative embodiment of a joint arrangement for an exemplary busway. As illustrated in the figure, two splice plates 1106a, 1106b are located on the outsides of the busbars 1108a, 1108b. The busbars 1108a, 1108b are connected together with no gap located between them.

Figure 10C:
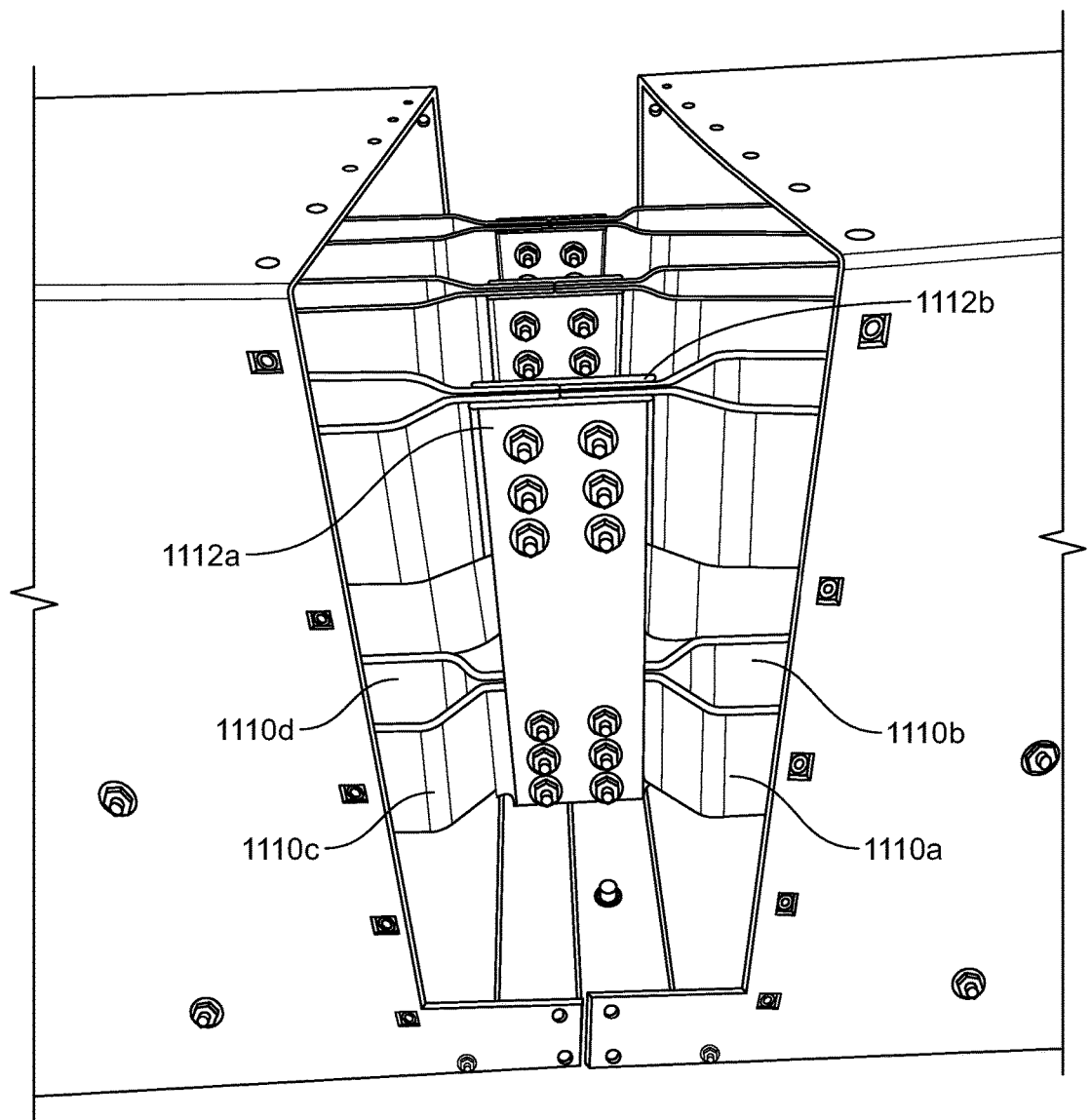
FIG. 10C illustrates a perspective view of another alternative embodiment of a joint arrangement for an exemplary busway.

FIG. 10C illustrates a perspective view of another alternative embodiment of a joint arrangement for an exemplary busway. As illustrated, the busbars 1110a, 1110b, 1110c, 1110d of the same phase are joined together by at least two splice plates 1112a, 1112b. The splice plates 1112a, 1112b are connected to the busbars in a similar arrangement as described in FIG. 10B. In another embodiment, not shown, the busbars of the same phase are joined together by at least four splice plates as described with respect to FIG. 10A. Joining the busbars of the same phase allows for the highest clearance and creep distances (phase to phase and phase to ground) for highest BIL rating. Additionally, joint arrangements for all busbars of each phase provides a maximum space for end user for joining sections together with splice plates.

Figure 11:
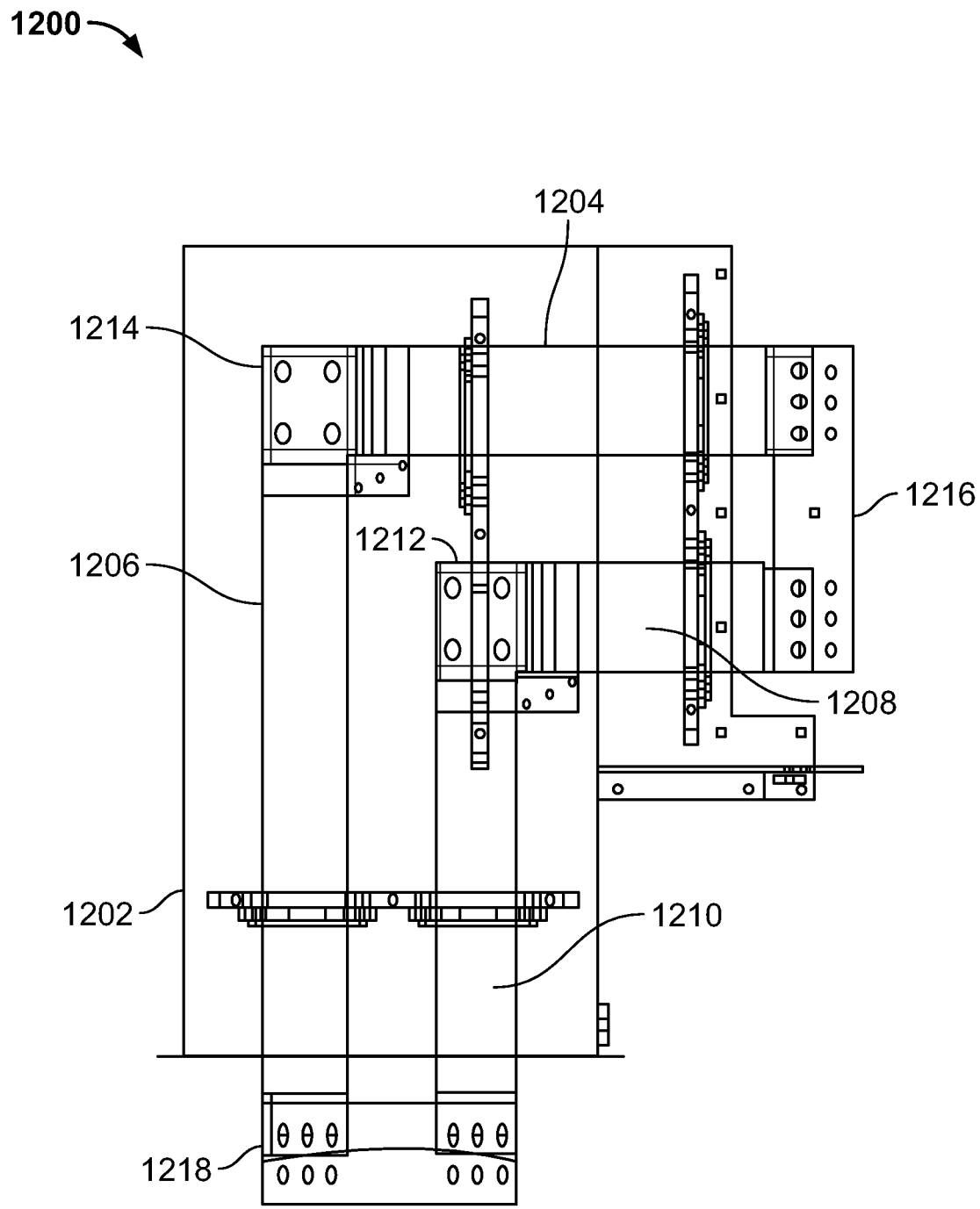
FIG. 11 illustrates a cross-sectional side view of an L-shaped busway arrangement.

FIG. 11 illustrates a cross-sectional side view of an L-shaped busway arrangement. The busbar arrangement 1200 is shown with an enclosure housing 1202 with busbars enclosed. First outer busbar 1204 is connected via a connection joint 1214 with second outer busbar 1206. Adjacent to the first outer and second outer busbars 1204, 1206, first inner busbar 1208 is connected via a connection joint 1212 to second inner busbar 1210. At one end of the second outer 1206 and second inner busbar 1210 a splice plate 1218 is connected to the busbars 1206, 1210. The splice plate 1218 is a customizable plate allowing for easy connection to a customer system. At the other end of the first outer busbar 1204 and first inner busbar 1208, a splice plate 1216 connects the busbar ends to a straight busway section.

Figure 12:
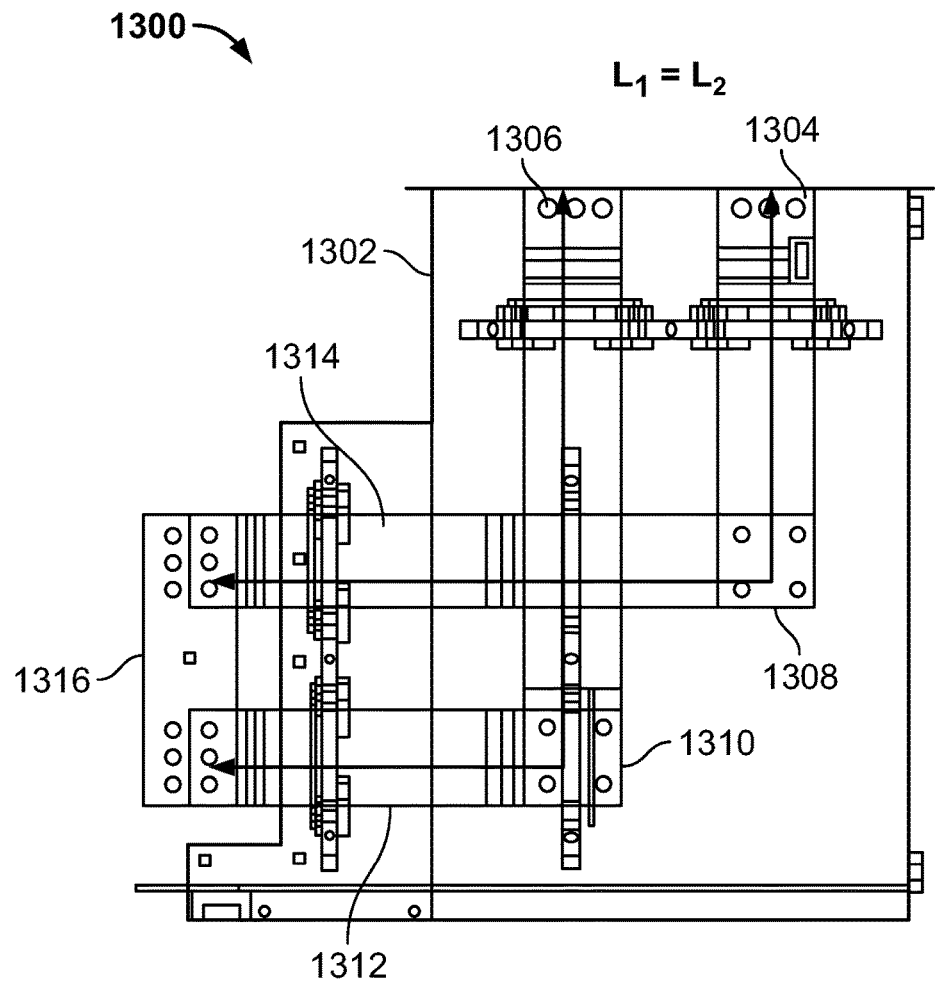
FIG. 12 illustrates a current balancing busbar arrangement according to another embodiment of an L-shaped busway arrangement.

FIG. 12 illustrates a current balancing busbar arrangement 1300 according to another embodiment of an L-shaped busway arrangement. The illustrated busbar arrangement 1300 equalizes length of a current path or creates equal voltage potential for balanced current distribution between bars of same phase. Equal busbar length per phase has higher reliability and equal utilization of a busbar cross-section. Additionally, equal busbar length per phase has better and improved thermal performance and allows for ample joint access during manufacturing and assembly of the insulating boot. In an enclosure housing assembly 1302, a first outer busbar 1304 forms a lap joint at a right angle 1308 with a second inner busbar 1314. Adjacent the first outer busbar 1304, a first inner busbar 1306 forms a lap joint at a right angle 1310 with a second outer busbar 1312. The first outer busbar 1304 has the same length as the second outer busbar 1312 and the first inner busbar 1306 has the same length as the second inner busbar 1314. Therefore, the length of the first outer busbar 1304 plus the second inner busbar 1314 is equal to the length of the first inner busbar 1306 plus the second outer busbar 1312. The connected busbar 1304, 1314 and 1306, 1312 can be terminated at the end by a termination connection (splice plate) 1316. The termination connection (splice plate) 1316 is rectangular but it is understood that the termination connection 1316 can be any geometric shape. The termination connection (splice plate) 1316 can be made of conductive metal, like copper, and is attached to the busbars 1312, 1314 using standard screws. It is understood, however, that the termination connection 1316 can be made from another material such as aluminum and can be secured using standard connections such as bolts.

The above merely illustrates the principles of the invention. It is thus appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A compact busway arrangement comprising:
   an enclosure assembly;
   at least two side mount supports affixed to the enclosure assembly;
   at least two horizontal supports, including at least a first horizontal support and a second horizontal support, connected and perpendicular to the at least two side mount supports;
   at least one busbar affixed to and extending between the first horizontal support and the second horizontal support;
   at least one strap connected to the first horizontal support and the second horizontal support; and
   at least one ground bus connected to the enclosure assembly.

2. The compact busway arrangement of claim 1 further including:
   at least one insulating boot, wherein the at least one insulating boot encapsulates an end point of the at least one busbar and sides of the at least one insulating boot are secured together;
   at least one splice plate, wherein the at least one splice plate connects to the end point of the at least one busbar; and
   at least one joint cover, connected to the end point of the at least one busbar to secure two or more compact busway arrangement sections together.

3. The compact busway arrangement of claim 2, wherein the at least one splice plate connects the at least one busbar to a second busbar of the two or more compact busway arrangement sections.

4. The compact busway arrangement of claim 1, wherein the at least one busbar has a two story busbar layout, the two-story busbar layout including:
   four busbars arranged in pairs on the at least two horizontal supports.

5. The compact busway arrangement of claim 1, wherein a phase conductor is included in the enclosure assembly without a phase barrier.

6. The compact busway arrangement of claim 1 further including a collar connection to secure two or more compact busway arrangement sections together.

7. The compact busway arrangement of claim 1, wherein the at least one busbar is arranged in an interleaved configuration.

8. The compact busway arrangement of claim 1, wherein the at least one busbar is a copper busbar and is arranged in a non-interleaved configuration.

9. The compact busway arrangement of claim 1, wherein the compact busway arrangement is one of a straight configuration, elbow configuration, T configuration, or flange configuration.

10. The compact busway arrangement of claim 1, wherein the at least two horizontal supports are one of glass polyester GPO-3, or epoxy or porcelain standoff insulators with GPO-3 supports.

11. A compact busway system comprising:
    an enclosure housing assembly;
    at least two enclosure housing assembly side supports connected to the enclosure housing assembly;
    at least two or more horizontal supports, including at least a first horizontal support and a second horizontal support, connected perpendicular to the at least two enclosure housing assembly side supports, wherein the first horizontal support is connected parallel to the second horizontal support;
    at least one or more busbars, the at least one or more busbars connected perpendicular to the first horizontal support and second horizontal support;
    at least one strap connected to the first horizontal support and the second horizontal support;
    at least one ground plate connected to the enclosure housing assembly;
    at least one splice plate, the at least one splice plate connected to a busbar joint of the at least one or more busbars;

at least one insulating boot covering the busbar joint; and at least one joint cover connected to the end point of the at least one or more busbars to secure multiple compact busway arrangement sections together.

12. The compact busway system of claim 11, wherein the at least one or more busbars are uninsulated for use in a 600V application.

13. The compact busway system of claim 11, wherein the at least one or more busbars are insulated for a 5 or 15 KV application.

14. The compact busway system of claim 11, wherein the at least one or more busbars are interleaved in a two-story configuration.

15. The compact busway system of claim 11, wherein the at least one or more busbars are non-interleaved in a two-story configuration.

16. The compact busway system of claim 11 further including a coupling plate configured to connect at a termination joint.

17. The compact busway system of claim 11, wherein the at least two or more horizontal supports are configured to have one of a length stagger support arrangement or a height stagger support arrangement.

18. The compact busway system of claim 11, wherein the at least one splice plate includes at least four splice plates encapsulating the at least one or more busbars, the at least one or more busbars are not in connection with one another.

19. A compact busway system comprising:

a continuous enclosure housing configured to meet dimensions for a compact design application for use in indoor or outdoor applications;

at least two side supports configured to fit within the continuous enclosure housing and attached to the continuous enclosure housing;

at least four horizontal supports, including a first horizontal support adjacent to a second horizontal support, and a third horizontal support adjacent the second horizontal support and a fourth horizontal support, the at least four horizontal supports connected to the at least two side supports;

at least four straps bolted at opposite ends of the at least four horizontal side supports, configured to support and exert a clamp force on the at least four horizontal supports;

at least one busbar, wherein the at least one busbar includes a coating for insulation and a plating, the at least one busbar clamped to the first horizontal support and the second horizontal support; and at least one ground bar connected to the continuous enclosure housing.

* * * * *